Nov. 3, 1942.                C. H. DICKE                2,300,838
                          STOKER MOTOR CONTROL
                   Filed March 27, 1939        2 Sheets—Sheet 1
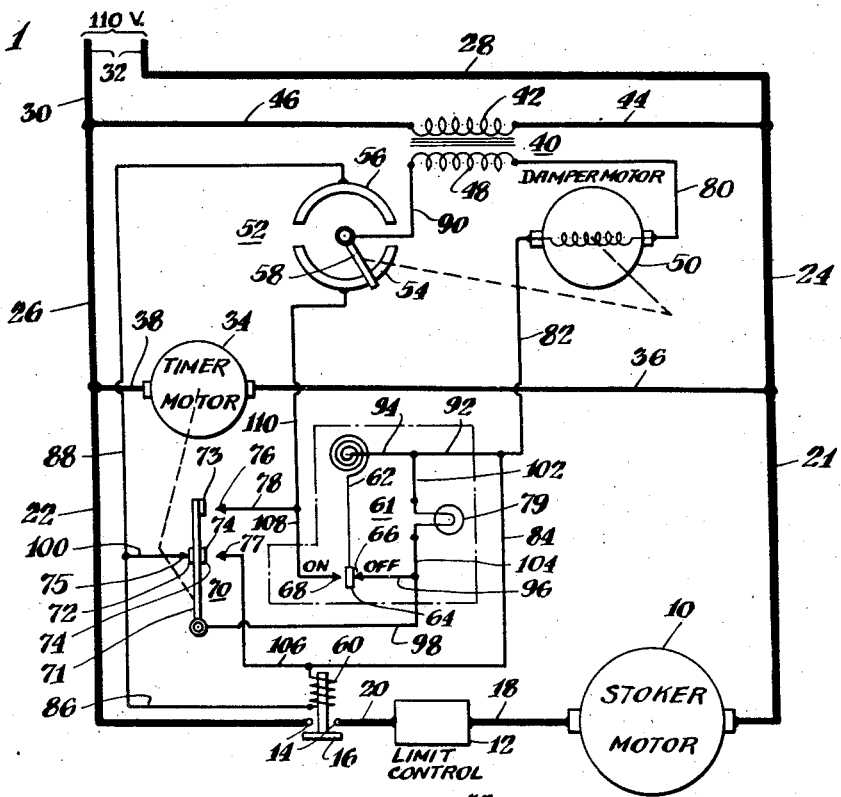
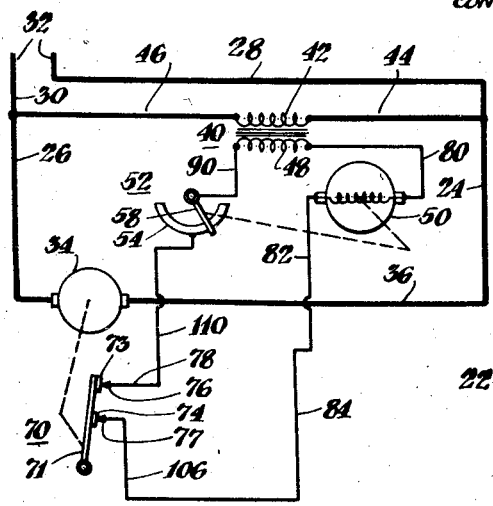
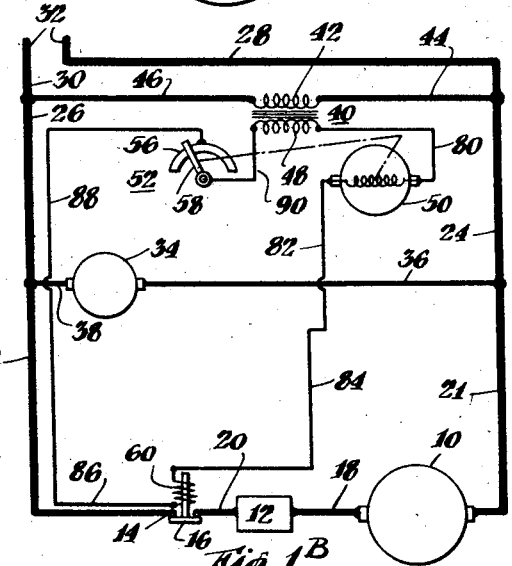
INVENTOR
Carl H. Dicke
BY
ATTORNEYS Nov. 3, 1942.   C. H. DICKE   2,300,838
STOKER MOTOR CONTROL
Filed March 27, 1939   2 Sheets-Sheet 2
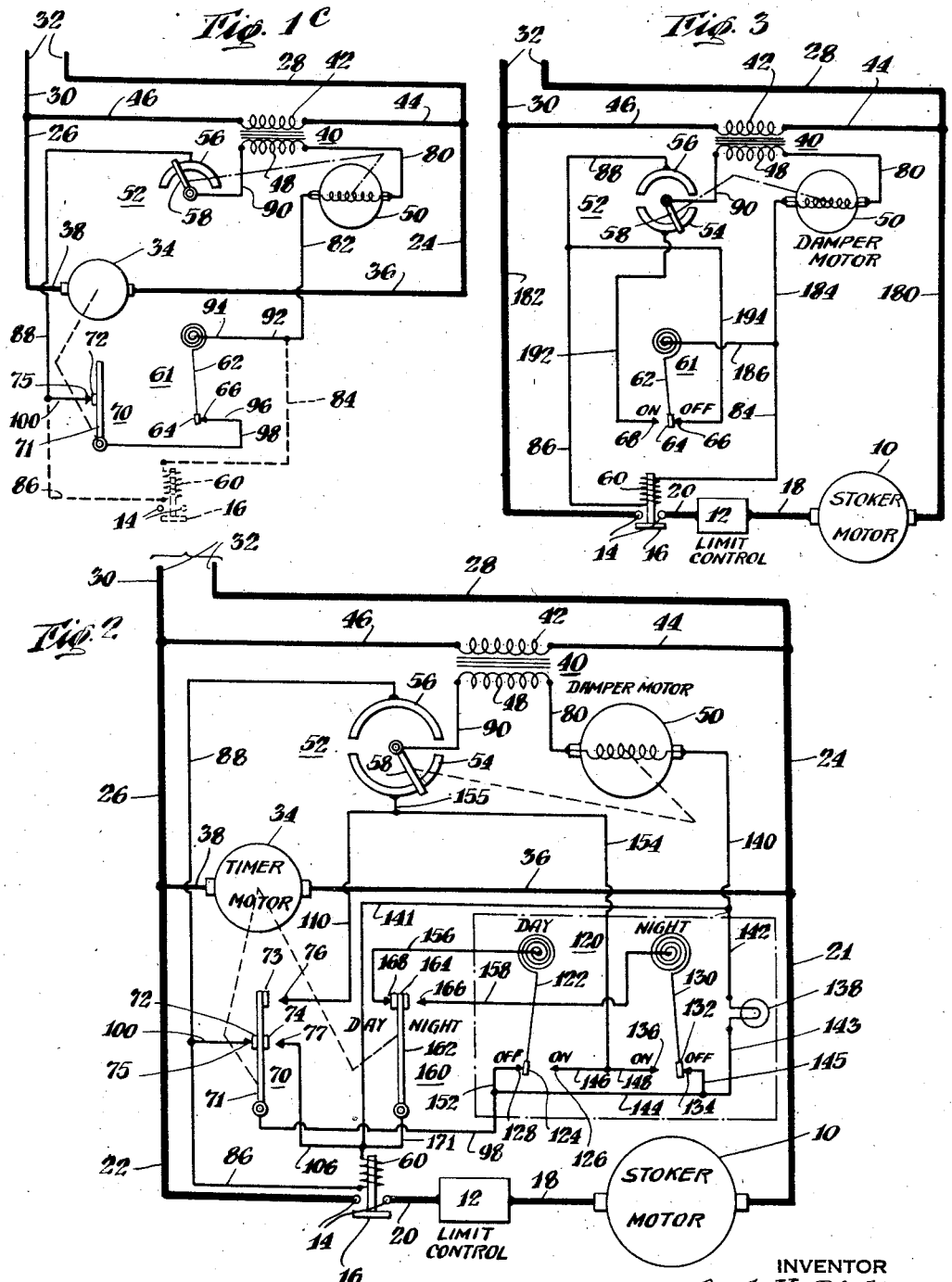
INVENTOR
Carl H. Dicke Patented Nov. 3, 1942

2,300,838

UNITED STATES PATENT OFFICE 2,300,838

STOKER MOTOR CONTROL

Carl H. Dicke, Dayton, Ohio, assignor to The Master Electric Company, a corporation of Ohio Application March 27, 1939, Serial No. 264,338

20 Claims. (Cl. 236—46)

This invention relates to an improved stoker motor control, and more particularly to a system correlating the control of stoker and damper motor circuits.

An object of this invention is the provision of an improved system for controlling the operation of a stoker motor.

Another object of this invention is the provision of an improved system for controlling the operation of a stoker motor in connection with the operation of a damper motor.

Still another object of this invention is the provision of an arrangement whereby the control of the fuel feed to a furnace is anticipated by a proper action of the damper.

A broader object of this invention consists in automatically preparing a condition producing apparatus, before said apparatus is controlled in response to a change in the condition produced.

A further object of this invention is the provision of a heat-responsive correlated damper and stoker motor control system which will be automatically energized at predetermined intervals of time irrespective of the call of the heat-responsive device.

An additional object of this invention is the provision of a day-night, heat-responsive correlated damper and stoker motor control system.

Other objects will become apparent from the following description taken in connection with the attached drawings showing several illustrative embodiments of the invention and wherein:

Fig. 1 is a circuit diagram of temperature-responsive correlated damper and stoker motor control system as used in connection with a predetermined time-responsive control device;

Figs. 1A, 1B and 1C are partial diagrams of the control system shown in Fig. 1, illustrating sequential steps of operation;

Fig. 2 illustrates a correlated damper and stoker motor system similar to that shown in Fig. 1, with the addition of a day-night control program; and Fig. 3 illustrates the basic temperature-responsive correlated damper and stoker motor control system arranged in accordance with the principles of this invention.

Fig. 1 illustrates a preferred embodiment of my temperature-responsive correlated damper and stoker motor control system, shown in connection with a timing or hold-fire switch operated at predetermined intervals to insure the maintenance of a minimum supply of fuel to the furnace so that the fire will not expire if there are no calls for heat. The stoker motor 10 is preferably serially connected with a limit control 12 and contacts 14 of a power relay 16 through the connectors 18, 20, 21, 22, 24, 26, 28 and 30 to the source of power 32. The limit control 12 may be responsive to any limiting condition, such as boiler pressure, water temperature, etc., or a combination of such limiting conditions. Limit switches in the stoker motor circuits are well known to the art, and its inclusion in the instant case forms no part of the invention. A timer motor 34, the operation of which will be more fully described hereafter, is also connected to the source of power by wires 30, 26, 38, 36, 24 and 28.

As a subsidiary source of power for the control apparatus, adapted to be operated at a lower voltage, the transformer 40 is provided. The primary winding 42 of the transformer 40 is connected to the source of power 32 by wires 30, 46, 44 and 28, while its secondary winding 48 is connected to the control apparatus.

For controlling the dampers of the furnace which is supplied with fuel by stoker motor 10, I prefer to use a damper motor 50 connected to said damper in any suitable manner (not shown). Actuated by the damper motor 50, there is also provided a commutating device 52 which may consist, for example, in a pair of arcuate contacting segments 54 and 56 against which a contacting arm 58 actuated in a suitable manner by the damper motor 50 is alternately urged. It is to be understood, however, that this invention is not limited to any particular type of commutating switch and such switch may take one of the several suitable forms known to the art.

The relay 16 for energizing the circuit of the stoker motor 10 has been illustrated as having a control winding 60. The illustration of this relay, is, however, merely diagrammatic, and any suitable relay may be used at this point. Attention is directed to the fact, however, that for purposes hereinafter described, the relay winding 60 must have a relatively high resistance.

In accordance with this invention, control of the damper motor and stoker motor circuit may be effected in response to temperature, as for example room temperature. For this purpose I have provided a thermostatic device generally indicated at 61 preferably consisting of a spiral bimetallic element 62 having a movable contact 64 connected at one end thereof, and adapted to alternatively engage stationary contacts 66 and 68 for commutating part of the control circuit.

Another principal control device consists of a timer switch generally indicated at 70 which is actuated by the timer motor 34 in any suitable manner (not shown). The timer switch may consist of a pivoted arm 71 provided with contacts 72, 73 and 74 adapted to respectively cooperate with stationary contacts 75, 76 and 77.

If desired, the room thermostat 61 may be provided with a pilot light 79 serving the function of informing the observer when the thermostat is in its heat-demanding position. As a supplemental function, the pilot light may also be positioned in such a place as to supply a small amount of heat to the thermostat 62, in order to provide a heat-anticipating type of temperature control in accordance with the teachings of the Dicke Patent 1,931,464, issued October 17, 1933.

The thermostat with its pilot light may form a separate constructional unit with terminals for conductors 92, 98 and 108, as indicated by the dotted lines in Fig. 1. The internal conductors 94, 96, 102 and 104 may then be in the form of bus-bars or the like.

As shown in Fig. 1, the room thermostat is in its "off" position, the timer switch is in its "off" position, the damper motor is in such a position that the check damper of the heating plant is open, and the relay coil 60 is de-energized, thus breaking the circuit to the stoker motor 10. If it is presumed that the room thermostat does not call for heat, after a predetermined time the timer motor 34, which is connected across the line and is therefore constantly energized, moves the timer switch 70 so that the contact arm 71 will complete a circuit between contacts 76 and 77 by means of the contacts 73 and 74. This position of the timer switch is illustrated in Fig. 1A. A circuit will then be completed from the secondary winding 48 of the transformer 40, conductor 80, damper motor 50, conductors 82, 84 and 106, contacts 77 and 74, switch arm 71, contacts 73 and 76, conductors 78 and 110, commutator segment 54, commutating arm 58, and conductor 90 to the other side of the secondary winding 48. This circuit therefore energizes the damper motor 50 which will rotate to close the check damper on the furnace. At this time the coil 60 of the stoker motor relay 16 will not be energized, and the pilot light 79 will not burn since it is short circuited by conductors 102 and 94, thermostat arm 62, contacts 64 and 66, and conductors 96 and 104.

The damper motor will continue to rotate for approximately half a revolution until the check damper is fully closed, and the commutating arm 58 assumes a position substantially as shown in Fig. 1B. In this position of the commutating arm 58 another circuit is established from one end of the secondary winding 48 of the transformer 40, conductor 80, damper motor 50, conductors 82 and 84, relay winding 60, conductors 86 and 88, commutating segment 56, commutating arm 58, and conductor 90 to the other side of the secondary winding 48. The relay winding 60 is accordingly energized and closes the circuit between contact 14. This establishes an energizing circuit for the stoker control motor 10 which may be traced from the source of power 32, conductors 28, 24 and 21, stoker motor 10, conductor 18, limit switch 12, conductor 20, contacts 14 bridged by relay 16, and conductors 22, 26 and 30 to the other side of the source of power 32. It will thus be seen that in this sequence of operation, the furnace is first prepared by closing the check dampers and only after these have been closed is the stoker motor circuit energized. In the control circuit illustrated in Fig. 1B attention is directed to the fact that while the damper motor is connected to the source of power from transformer 40, it will not now rotate since it is only connected to the source of power through the relay winding 60. As previously described, the relay winding 60 is formed with a substantial resistance, and in fact, such a resistance as will prevent rotation of the damper motor when it is in series therewith. Accordingly, as long as the timer switch does not move to its off position, the check damper will remain closed and the stoker motor will continue to feed fuel.

When, however, after a predetermined time, the timer switch returns to its off position, circuits will be established as illustrated in Fig. 1C. Starting from the secondary winding 48 of the transformer 40, current will flow through conductor 80, damper motor winding 50, conductors 82, 92 and 94, arm 62 of the thermostat 61, contacts 64 and 66, conductors 96 and 98, switch arm 71 of the timer switch 70, contacts 72 and 75, conductor 88, commutator segment 56, commutating arm 58, and conductor 90 to the other side of the secondary winding 48. At the same time the relay winding 60 will be short circuited by conductors 84, 92 and 94, thermostat arm 62, contacts 64 and 66, conductors 96 and 98, switch arm 70, contacts 72 and 75, and conductor 86. The relay 16 will accordingly drop to break the circuit to the stoker motor. This will be done immediately before the damper motor has had the opportunity to move a substantial distance. Accordingly, the check damper will not be re-opened and the control elements restored to their original position (as seen in Fig. 1) until the feeding of fuel to the furnace has all together ceased.

A sequence of control similar to that as described in connection with the timer motor and switch will take place when the thermostat 61 calls for heat. Upon movement of the thermostat arm 62 to the "on" position a circuit will be established from one side of the secondary winding 48 of the transformer 40 through conductor 80, damper motor 50, conductors 82, 92 and 94, thermostat arm 62, contacts 64 and 68, conductors 108 and 110, commutator segment 54, commutating arm 58, and conductor 90 to the other side of the secondary winding 48. No circuit is completed through the relay coil 60 or the pilot light 79.

The damper motor being thus energized, it will rotate to close the check damper, until the commutating arm 58 arrives substantially in a position shown in Fig. 1B. A relay energizing circuit will then be formed in the same manner as when actuation of the damper motor was caused by movement of the timer switch. This circuit is illustrated in Fig. 1B. As previously described, the damper motor will not now operate due to the resistance of the relay coil 60 and the parts will remain in this position, the stoker motor being energized, as long as the thermostat calls for heat. An additional circuit will also be established at this time through the pilot light 79. This circuit may be traced from the energized conductor 82 through conductors 92 and 102, pilot lamp 79, conductors 104 and 98, switch arm 71 of the timer switch 70, contacts 72 and 75, and conductor 100 to the live conductor 88.

Assuming now that the temperature has risen to such a degree that the thermostat moves to its off position, a circuit will now be established for the damper motor, exactly as shown in Fig.

1C. As previously described, the relay coil 60 will now be short circuited and the relay 16 will drop to open the circuit to the stoker motor. The damper motor will be energized to open the damper and return the commutating arm 58 to substantially the position illustrated in Fig. 1. It will be noted that actions of the timer and thermostatic switches are wholly independent of one another. If either one is "on" the system will be set to operation to energize the stoker motor.

The interconnection between the timer switch 70 and timer motor 34 may be accomplished in any one of a number of ways known to the art. In practice the switch is actuated generally at 10, 15, 20, 30 or 60 minute intervals while the period of actuation is adjustable up to 28 minutes. It is obvious, however, that the times may be varied to suit individual conditions.

The combined stoker and damper motor control system illustrated in Fig. 2 is identical with that shown in Fig. 1 with the exception that alternative day or night control is provided. In this case, the timer motor preferably operates a day-night switch 160 which places either a day thermostat 122 or a night thermostat 130, which are set for different temperature ranges, into the control circuit. The hold-fire timer switch control 70 and its attendant circuits is the same as before, and only that operation relating to the day-night control need therefore be described in detail.

Assuming that the day-night switch is in its "day" position as indicated, when the day thermostat 122 moves into its "on" position a circuit will then be established for the damper motor 50 from the secondary winding 48 of the transformer 40, conductor 80, damper motor 50, conductors 140, 141 and 171, switch arm 162 of the day-night switch 160, contacts 164 and 168, thermostat arm 122, contacts 124 and 126, conductors 146, 154 and 155, commutator segment 54, commutator arm 58, and conductor 90 to the other side of the secondary winding 48. The damper motor 50 will then be energized, and the sequence of operation will be identical as described above in connection with the single thermostat 61 of Fig. 1. Assuming now that the day-night switch 160 is moved to the "night" position and the night thermostat 130 is moved to the "on" position, a circuit will then be established from one end of the secondary winding 48 of the transformer 40 through conductor 80, damper motor 50, conductors 140, 141 and 171, switch arm 162, contacts 164 and 168, conductor 158, thermostat arm 130, contacts 132 and 136, conductors 148, 154 and 155, commutator segment 54, commutating arm 58 and conductor 90 to the other side of the secondary transformer winding 48. The damper motor is thus again energized and the same sequence of operation will follow.

It will be noted that the day-night transfer switch is only necessary in the "on" circuit of the day-night thermostat. A common "off" circuit to return the damper motor to its original position may be used without a transfer switch. It will be seen that the respective "off" contacts 128 and 134 of the day and night thermostat are connected to one another through conductors 152, 144 and 145 and then by conductor 98, switch arm 71 of the timer switch 70, contacts 72 and 75 and conductors 100 and 88 to the upper commutator segment 56.

It will be noted that a single pilot light 138 may be used for both thermostats. This light is connected at one end to the common "off" terminals by a conductor 143 and at its other end to the bimetallic element of the thermostat in use through conductors 142, 141 and 171, switch arm 162 of the day-night switch 160 and then to either thermostat arm 122 through contacts 64 and 68 and conductor 156 or to the thermostat arm 130 through contacts 164 and 166, and conductor 168. This arrangement results in a connection of the pilot light 138 to either thermostat in use, which is identical with its connection to the single thermostat 61 in the system illustrated in Fig. 1. As shown diagrammatically in Fig. 2, the thermostat control 120 may be formed as a single unit, as indicated by the dotted lines. This unit will consist of the day and night thermostat and the pilot light 138. In this case, the internal connection such as the conductors 143, 144, 145, 146 and 148 may be formed as bus-bars and the outgoing conductors 142, 154, 156, 158 and 98 will end in terminals to which the other apparatus is connected.

The invention in its simplest form is illustrated in Fig. 3 which illustrates a simple thermostat control of the combined damper and stoker motor system, without the use of a timing switch or a day-night switch. The system is illustrated with the thermostat in the "off" position and the damper motor rotated so as to open the check damper. When the thermostat calls for heat a circuit will be established from the secondary winding 48 of the transformer 40, through connector 80, the damper motor 50, conductors 184 and 186, thermostat arm 62 of the thermostat 61, contacts 64 and 68, conductor 192, commutator segment 54, commutating arm 58 and conductor 90 to the other side of the secondary winding 48. This will start rotation of the damper motor 50 to close the damper and the relay 16 will not close until the commutating arm 58 contacts the commutator segment 56 at which time the damper motor will then stop due to the resistance of the relay coil 60. When the thermostat moves to the "off" position, the sequential operation previously described in connection with the preceding circuit will then take place.

Many modifications of the aforedescribed systems will occur to those skilled in this art. For example, it is obviously not necessary that the control circuits be connected to the source of power through a transformer, but if the proper controls are chosen, they may be energized from the same source and at the same voltage as the stoker motor circuits. Conversely, the timer motor, illustrated as connected to the full source voltage, might, if desired, be supplied with its power through a transformer. Additionally, it is not necessary that the timer switch be a motor actuated switch, but it might be actuated in any periodic manner, either electrically or mechanically.

The type of thermostat control illustrated need, of course, not be followed, since any suitable temperature-responsive device capable of making and breaking two circuits can be used.

While my basic correlated damper and stoker motor control system has been shown as only applied to two additional types of control, it is capable of being integrated with many of the other types of control systems now known to the art. For example, while it is applied to a hold-fire timer control in Fig. 1, and a hold-fire timer control and day-night control in Fig. 2, it could readily be combined with the simple day-night control alone. It is also obvious that under certain conditions my system can be applied to a periodic furnace control without a room or other thermostat.

While my control system has been described and illustrated as applied to a combined damper and stoker motor control system, in its broadest sense, it is applicable to the control of any condition producing device. Merely by way of example, the main motor might drive a pump, the control motor a valve or valves, and the actuating switch might be pressure or water level responsive instead of temperature-responsive. In the furnace control itself, various changes can readily be made. The auxiliary motor might control the furnace draft instead of the check dampers, in which case they would open the draft before starting of the fuel feed instead of close the check damper as in the present case. It is possible, of course, that the damper motor 50 could perform both of the functions by a suitable relationship of levers and crank arms. Instead of the control being responsive to the temperature of a room, it might be in response to the temperature of the stack or other parts of the furnace, or even to a difference in temperature such as between the inside and the outside of a building.

Accordingly, while I have herein shown and described only certain embodiments of certain features of my present invention, it is to be understood that they are to be regarded as merely as illustrative and that I do not intend to limit myself thereto except as may be required by the following claims:

1. In a furnace control system having fuel-feed and damper controlling apparatus, the combination of a source of power, a fuel-feed control motor, a switch having a pair of contacts and an actuating winding, conductors for serially connecting said fuel-feed motor and the contacts of said switch with said source of power, a damper controlling apparatus having an actuating winding, a commutating device having an arm movable between two contacts in accordance with the movement of said damper controlling apparatus, a temperature-responsive device movable between circuit commutating positions, means for connecting the damper control actuating winding to the source of power when the temperature-responsive device and commutating device are in predetermined control positions, means for serially connecting said damper control actuating winding and the actuating winding of said switch with said source of power when said temperature-responsive device is in the same position, but said commutating device has moved to its other commutating position, and means for short-circuiting the actuating winding of said switch and connecting said damper control actuating winding to the source of power when said temperature-responsive device and said commutating device are both in their other commutating positions.

2. The combination according to claim 1, in which the actuating winding of said switch is of sufficiently high resistance to prevent actuation of said damper controlling apparatus by its actuating winding when the two windings are serially connected.

3. In a furnace control system having fuel-feed and damper controlling apparatus, the combination of a source of power, a fuel-feed control motor, a switch having a pair of contacts and an actuating winding, conductors for serially connecting said fuel-feed motor and the contacts of said switch with said source of power, a damper controlling apparatus having an actuating winding, a commutating device having an arm movable between the two contacts in accordance with the movement of said damper controlling apparatus, a time-responsive switch movable between two circuit commutating positions, means for directly connecting the damper control actuating winding to the source of power when the time-responsive switch and said commutating device are in predetermined control positions, means for serially connecting said damper control actuating winding and the actuating winding of said switch with said source of power when the time-responsive switch is in the same position but said commutating device has moved to its other commutating position, and means for short-circuiting the actuating winding of said switch and directly connecting the actuating winding of said damper control device to the source of power when said time-responsive switch and said commutating device are both in their other commutating position.

4. The combination according to claim 3, in which the actuating winding of said switch is of sufficiently high resistance to prevent actuation of said damper controlling apparatus by its actuating winding when the two windings are serially connected.

5. In a motor control system, a main motor, a first switch, a source of power, conductors for serially connecting said motor and said switch with said source of power, an actuating coil for said switch, a second source of power, a control motor, a second, single-pole, double-throw switch operated by said control motor, a third switch, and other conductors interconnecting said second source of power, said control motor, said actuating coil, and said second and third switches with one another in such a manner that in predetermined correlated positions of said second and third switches said control motor may be connected directly to said second source of power through said second and third switches, and in another predetermined correlated position of said second switch, said control motor may be connected serially with said actuating coil through said second switch to the second source of power for energizing said actuating coil.

6. The combination according to claim 5, in combination with thermo-responsive device for actuating said third switch.

7. The combination according to claim 5, in combination with a time-controlled means for actuating said third switch.

8. The combination according to claim 5, wherein said actuating coil is of sufficiently high resistance to prevent movement of said control motor when serially connected therewith.

9. The combination according to claim 5, in combination with a third motor connected to said source of power, and means for actuating said third switch by said third motor at predetermined intervals of time.

10. In a motor control system, a main motor, a switch, a source of power, conductors for serially connecting said motor and said switch with said source of power, an actuating coil for said switch, a second source of power, a control motor, a second, single-pole, double-throw switch operated by said control motor, a thermo-responsive switch, other conductors interconnecting said second source of power, said control motor, said actuating coil, said second switch and said thermo-responsive switch with one another in such a manner that in certain predetermined correlated positions of said second switch and said thermo-responsive switch said control motor is connected directly to said second source of power through said second switch and said thermo-responsive switch, and in another predetermined position of said second switch and said thermo-responsive switch, said control motor is connected to said second source of power serially with said actuating coil through said second switch for energizing said actuating coil and connecting said main motor to the source of power, and a time-control switch in shunt with said thermo-responsive switch, whereby upon predetermined intervals of time said control motor is connected directly to said second source of power through said second switch and said time control switch or serially with said actuating coil irrespective of the position of said thermo-responsive switch.

11. The combination according to claim 10, wherein said actuating coil is of sufficiently high resistance to prevent movement of said control motor when serially connected therewith.

12. In a motor control system, a main motor, a first switch, a source of power, conductors for serially connecting said motor and switch with said source of power, an actuating coil for said switch, a second source of power, a control motor, a second, single-pole, double-throw switch operated by said control motor, a pair of thermo-responsive switches electrically connected to said control motor, a transfer switch for alternatively connecting one of said thermo-responsive switches in circuit with said actuating coil and said second switch, and other conductors interconnecting said second source of power, said control motor, said actuating coil, said second switch, and the connected thermo-responsive switch with one another in such a manner that said control motor is connected directly to said second source of power through said second switch and the connected thermo-responsive switch in one predetermined correlated position of said second switch and the connected thermo-responsive switch, and said control motor is connected to said second source of power serially with said actuating coil through said second switch in another correlated position of said second switch and said connected thermo-responsive switch.

13. The combination according to claim 12, in combination with means for periodically operating said transfer switch.

14. The combination according to claim 12, wherein said actuating coil is of sufficiently high resistance to prevent movement of said control motor when serially connected therewith.

15. The combination according to claim 12, in combination with a time-responsive switch, and conductors for connecting said time-responsive switch in shunt with said thermo-responsive and transfer switches.

16. In a system wherein a condition changing apparatus is controlled by a pair of electrically operated devices, the combination of a circuit controlled for one of said devices having an actuating coil, an actuating coil for the other device, a first single-pole double-throw switch controlled by the other of said devices, a source of power, a second single-pole double-throw switch and conductors interconnecting said actuating coils and said single-pole double-throw switches in such a manner that in predetermined correlated positions of said switches the actuating coil for said other device is connected directly to said source of power, and in other predetermined correlated position of said switches said actuating coils are serially connected with one another to said source of power, whereby the circuit controller for the one of said devices is actuated.

17. The combination according to claim 16, in which said other electrically operated device is a motor.

18. The combination according to claim 16, in which the pole of said second single-pole double-throw switch is a thermo-responsive element.

19. The combination according to claim 16, in combination with means for periodically actuating the pole of said second single-pole double-throw switch.

20. The combination according to claim 16, in which the actuating coil of the circuit controller for the one of said devices has a sufficiently high resistance to prevent actuation of said second circuit controlling device when the two actuating coils are serially connected to the source of power.

CARL H. DICKE.